United States Patent [19]
Ogawa et al.

[11] Patent Number: 5,337,137
[45] Date of Patent: Aug. 9, 1994

[54] HEIGHT SENSOR AND AIR SPRING DEVICE INCORPORATING THE SAME

[75] Inventors: Fumio Ogawa, Yokohama; Norio Nihei, Kodaira, both of Japan

[73] Assignees: Stanley Electric Co., Ltd.; Bridgestone Corp., both of Tokyo, Japan

[21] Appl. No.: 997,870

[22] Filed: Dec. 29, 1992

[30] Foreign Application Priority Data

Jan. 9, 1992 [JP] Japan .................... 4-002355

[51] Int. Cl.⁵ .................... G01C 3/08; B60G 11/26
[52] U.S. Cl. .................... 356/4; 280/707
[58] Field of Search .................... 356/4; 280/707

[56] References Cited

U.S. PATENT DOCUMENTS

| | | | |
|---|---|---|---|
| 4,752,799 | 6/1988 | Stauffer | 354/403 |
| 4,798,369 | 1/1989 | Geno et al. | 280/707 |
| 4,817,922 | 4/1989 | Hovance | 280/707 |
| 4,996,415 | 2/1991 | Tanaka et al. | 250/221 |
| 5,056,913 | 10/1991 | Tanaka et al. | 356/4 |
| 5,229,829 | 7/1993 | Nihei et al. | 356/4 |

FOREIGN PATENT DOCUMENTS

| | | |
|---|---|---|
| 0291394 | 11/1988 | European Pat. Off. |
| 0313501 | 4/1989 | European Pat. Off. |
| 0419082 | 3/1991 | European Pat. Off. |
| 2591330 | 12/1987 | France |

Primary Examiner—Stephen C. Buczinski
Attorney, Agent, or Firm—Oliff & Berridge

[57] ABSTRACT

A height sensor for determining the height from a surface to be measured on the basis of an optical path length from a light-emitting element to the surface to be measured includes: a first light-emitting element and a second light-emitting element disposed at positions spaced apart from the surface to be measured; a mirror for reflecting at least one of a beam of light emitted from the first light-emitting element and a beam of light emitted from the second light-emitting element; and a light-receiving element for receiving the beams emitted by the first and second light-emitting elements and reflected by the surface to be measured and for outputting a signal corresponding to a quantity of light received. The mirror is arranged to cause respective optical paths of the beams emitted from the first and second light-emitting elements to be brought into close proximity to each other. Another mirror is provided for producing an optical path difference between the respective optical path lengths from the first and second light-emitting elements to the surface to be measured.

26 Claims, 9 Drawing Sheets

HEIGHT SENSOR AND AIR SPRING DEVICE INCORPORATING THE SAME

BACKGROUND OF THE INVENTION

1. Field of the Invention

The present invention relates to a height sensor and an air spring device and, more particularly, to a height sensor such as a vehicle height sensor, a level sensor, and a distance sensor for optically detecting the height of an automobile, a streetcar and other vehicle. The invention also relates to an air spring device incorporating this height sensor, such as an air spring for a vehicle and an air spring for vibration isolation and damping used in an industrial machine, a building or the like.

2. Description of the Related Art

Conventionally, a magnetic type sensor, an ultrasonic type sensor, an optical reflection type sensor, and the like have been proposed as a height sensor which can be incorporated in an air spring. However, the magnetic type sensor has a drawback in that the stroke of the air spring is limited depending on the structure of the air spring, while the ultrasonic type sensor has a drawback in that the cost is high. On the other hand, although most of the optical reflection type sensors are less affected by these drawbacks, they have a problem in that if a light reflection plate becomes contaminated with dirt or the like and its light reflectance varies greatly, the measured results also vary, thereby making it impossible to ensure precision.

For this reason, the present inventors have proposed a height sensor which overcomes the above-described drawbacks as disclosed in U.S. Pat. Ser. No. 07/924,467, now U.S. Pat. No. 5,229,829. As shown in FIG. 11, this height sensor comprises a pair of light-emitting elements constituted by a first light-emitting element 10 and a second light-emitting element 12. The first light-emitting element 10 and the second light-emitting element 12 are disposed at positions spaced at different distances from a surface to be measured 14 and are adapted to emit beams of light alternately. If it is assumed that the height of the first light-emitting element 10 from the surface to be measured 14 is x, the difference in height (an amount of offset) between the first light-emitting element 10 and the second light-emitting element 12 is $X_o$, the luminous intensity of the first light-emitting element 10 is $C_1$, the luminous intensity of the second light-emitting element 12 is $C_2$, and the reflectance of the surface to be measured 14 is R, then the output E1 of a light-receiving element 16 at the time when the first light-emitting element 10 emits a beam is expressed by Formula (1) below, while the output E2 of the light-receiving element 16 at the time when the second light-emitting element 12 emits a beam is expressed by Formula (2) below.

$$E1 \propto \frac{R \cdot C_1}{x^2} \quad (1)$$

$$E2 \propto \frac{R \cdot C_2}{(x + X_o)^2} \quad (2)$$

If the ratio of the output E1 to the output E2 is determined, it is expressed by Formula (3) below, and the output ratio E1/E2 ceases to be affected by the reflectance R of the surface to be measured 14.

$$E1/E2 \propto \frac{C_1}{C_2}\left(1 + \frac{X_o}{x}\right)^2 \quad (3)$$

Accordingly, even in a case where the reflectance R of the surface to be measured 14 varies due to the contamination and the outputs E1 and E2 decrease as shown in FIG. 12, it is possible to prevent the undesirable effects of the contamination of the surface to be measured 14 by using the output ratio E1/E2. Accordingly, this height sensor is provided with a signal processor circuit 18 which comprises a logarithmic converter circuit, a filter, and a rectifier circuit. The first light-emitting element 10 and the second light-emitting element 12 are made to emit beams of light alternately, and the light-receiving element 16 receives the beams reflected from the surface to be measured 14 and outputs a signal corresponding to the quantity of light received. The signal outputted from the light-receiving element 16 is subjected to logarithmic conversion by the logarithmic converter circuit. The output of the logarithmic converter circuit has its direct current components removed by the filter, the direct current components being the signal components having a frequency lower than the light emission frequency signal of the light-emitting elements. The peak-to-peak value of the remaining alternating current components corresponds to a value obtained by subtracting the logarithmically converted value of the signal outputted from the light-receiving element 16 when the second light-emitting element 12 emits a beam, from the logarithmically converted value of the signal outputted from the light-receiving element 16 when the first light-emitting element 10 emits a beam, i.e., corresponds to the ratio between the signal outputted from the light-receiving element 16 when the first light-emitting element 10 emits a beam and the signal outputted from the light-receiving element 16 when the second light-emitting element 12 emits a beam. Accordingly, by rectifying this filter output, it is possible to obtain a signal corresponding to the height x of the first light-emitting element 10 from the surface to be measured 14.

However, with the above-described height sensor, since the pair of light-emitting elements are disposed with a horizontal distance L therebetween, that area of the reflection plate which the beams from both light-emitting elements can reach is relatively small. In particular, if the reflection plate, i.e., an area to be measured, approaches the light-emitting elements' side beyond the straight line A shown in FIG. 11, the area of light which can be received by the light-receiving element (the shadowed portion in the drawing) becomes very small, so that the amount of light received by the light-receiving element is reduced sharply. Accordingly, if the distance between the light-emitting elements and the reflection plate becomes smaller, it becomes difficult for the sensor to detect the distance.

In addition, since the pair of light-emitting elements need to be disposed by being spaced apart from each other in the heightwise direction by an amount of offset $X_o$, there is a problem in that the heightwise dimension of the height sensor becomes long, with the result that the height sensor becomes relatively large in size. To overcome this problem, it suffices if the amount of offset $X_o$ is reduced, but since the effect of the reflectance of the light reflection plate is prevented by the amount of offset $X_o$, the accuracy becomes deteriorated if the amount of offset $X_o$ is reduced.

SUMMARY OF THE INVENTION

An object of the present invention is to provide a height sensor and an air spring device with the height sensor which are capable of reliably detecting the distance to a surface to be measured even in a short range in which the surface to be measured and light-emitting elements are located close to each other.

Another object of the present invention is to provide a height sensor and an air spring device with the height sensor in which the heightwise dimension of the height sensor is small and measurement accuracy is excellent.

In accordance with one aspect of the present invention, there is provided a height sensor for determining the height from a surface to be measured on the basis of an optical path length from a light-emitting element to the surface to be measured, comprising: a first light-emitting element and a second light-emitting element disposed at positions spaced apart from the surface to be measured; a reflecting member for reflecting at least one of a beam of light emitted from the first light-emitting element and a beam of light emitted from the second light-emitting element, the reflecting member being arranged to cause respective optical paths of the beams to be brought into close proximity to each other; and a light-receiving element for receiving the beams emitted by the first light-emitting element and the second light-emitting element and reflected by the surface to be measured and for outputting a signal corresponding to a quantity of light received.

In accordance with the above-described aspect of the invention, with respect to the light-receiving area of the light-receiving element, an overlapping portion of the area irradiated by the first light-emitting element the area irradiated by the second light-emitting element becomes large. As a result, the height of the surface to be measured can be detected reliably even in a case where the surface to be measured is located at a short distance from the light-emitting elements.

In accordance with another aspect of the present invention, there is provided a height sensor for determining the height from a surface to be measured on the basis of an optical path length from a light-emitting element to the surface to be measured, comprising: a first light-emitting element and a second light-emitting element disposed at positions spaced apart a substantially identical distance from the surface to be measured; a reflecting member arranged to reflect and introduce to the surface to be measured at least one of a beam of light emitted from the first light-emitting element and a beam of light emitted from the second light-emitting element so as to provide an optical path difference between an optical path length from the first light-emitting element to the surface to be measured and an optical path length from the second light-emitting element to the surface to be measured; and a light-receiving element for receiving the beams emitted by the first light-emitting element and the second light-emitting element and reflected by the surface to be measured and for outputting a signal corresponding to a quantity of light received. Since an optical path difference is provided between the optical path length from one light-emitting element to the surface to be measured and the optical path length from the other light-emitting element to the surface to be measured by disposing a reflection mirror, the two light-emitting elements can be arranged at a substantially identical distance from the surface to be measured, thereby making it possible to reduce the heightwise dimension of the sensor.

In accordance with still another aspect of the present invention, there is provided a height sensor for determining the height from a surface to be measured on the basis of an optical path length from a light-emitting element to the surface to be measured, comprising: a first light-emitting element and a second light-emitting element disposed at positions spaced apart from the surface to be measured; a light-receiving element for receiving beams of light respectively emitted by the first light-emitting element and the second light-emitting element and reflected by the surface to be measured and for outputting a signal corresponding to a quantity of light received; and a three-dimensional mirror having a shape of a triangular pyramid whose three slanting surfaces are formed as mirror surfaces and whose apex is oriented toward the surface to be measured. The light-emitting elements and the three-dimensional mirror are arranged such that the beam emitted from the first light-emitting element is reflected by a first slanting surface of the three-dimensional mirror onto the surface to be measured, and such that the beam emitted from the second light-emitting element is reflected by a second slanting surface of the three-dimensional mirror onto the surface to be measured. Preferably, the beam from the first light-emitting element is made incident upon the first slanting surface of the three-dimensional mirror after it is reflected by a reflecting mirror. Preferably, the beams reflected from the surface to be measured are reflected by a third slanting surface of the three-dimensional mirror before they are made incident upon the light-receiving element.

In accordance with a further aspect of the present invention, there is provided an air spring device incorporating the above-described height sensor, wherein a reflection plate is mounted to one of an upper spring member and a lower spring member of an air spring, while a first light-emitting element, a second light-emitting element, and a light-receiving element are mounted to the other one thereof.

It should be noted that the phrase "optical paths are brought into close proximity to each other" when the beams are reflected by the reflecting member means that the distance between the two optical paths becomes much shorter than the distance between the two light-emitting elements, and this phrase should be construed to include virtual coincidence of the optical paths as well.

The above and other objects and features of the invention will more fully appear from the following detailed description when read in conjunction with the accompanying drawings. It is to be expressly understood, however, that the drawings are for purpose of illustration and are not intended as a definition of the limits of the invention.

DESCRIPTION OF THE PREFERRED EMBODIMENTS

Referring now to the accompanying drawings, a detailed description will be given of the embodiments of the present invention. It should be noted, however, that the present invention should not be construed as being limited to these embodiments. In these embodiments, the height sensor of the present invention is used as a vehicle height sensor, and this vehicle height sensor is incorporated in an air spring for a vehicle.

Figure 1:
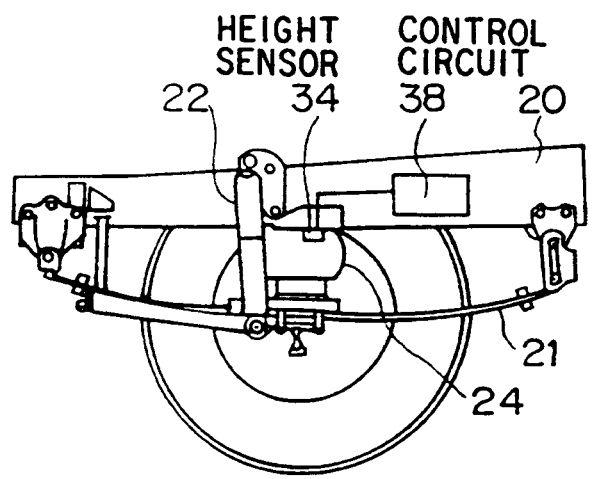
FIG. 1 is a schematic diagram illustrating a state in which an air spring is mounted to a vehicle body.

As shown in FIG. 1, an air spring 24 is disposed between a vehicle body 20 and a leaf spring 21 located on the vibration-receiving side. A shock absorber 22 is provided in the vicinity of this air spring 24. A vehicle height sensor 34 is incorporated in the air spring 24, and is connected to a control circuit 38 for controlling the vehicle height. By the use of this air spring, the air pressure within the air spring can be regulated on the basis of the vehicle height detected by the vehicle height sensor 34, thereby making it possible to adjust the vehicle height and the spring constant.

Figure 2:
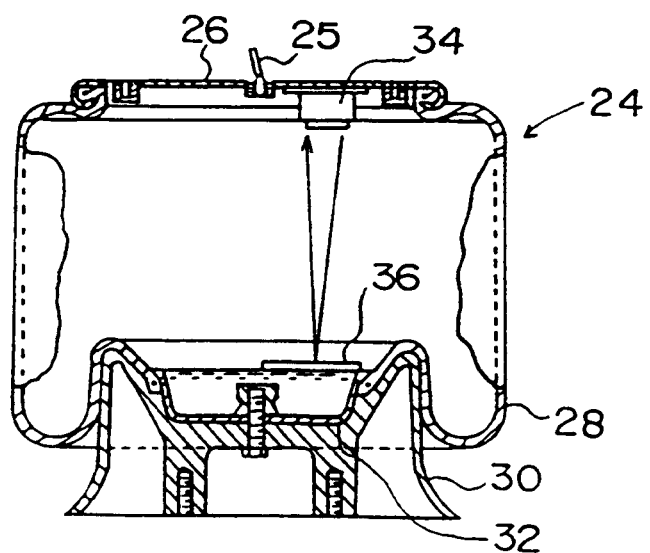
FIG. 2 is an enlarged cross-sectional view of the air spring shown in FIG. 1.

FIG. 2 shows an enlarged cross-sectional view of the air spring 24. The air spring 24 has a substantially cylindrical rubber sleeve 28, one end of which is calked to the outer periphery of an end cap 26 constituting an upper spring member. A piston 30, which is capable of moving into the rubber sleeve 28, is provided at the other end portion of the rubber sleeve 28. This other end portion of the rubber sleeve 28 is mounted to the piston 30 by a keeper metal fitting 32 constituting a lower spring member. Accordingly, a sealed off space is formed inside the rubber sleeve 28. The end cap 26 is provided with a duct 25 for controlling the air pressure within the rubber sleeve 28. The duct 25 passes through the end cap 26. The vehicle height sensor 34 is mounted to the underside of the end cap 26. A reflection plate 36 is provided at the position on the keeper metal fitting 32 which opposes the vehicle height sensor 34. It should be noted that the respective mounting positions of the vehicle height sensor 34 and the reflection plate 36 may be switched.

Figure 3:
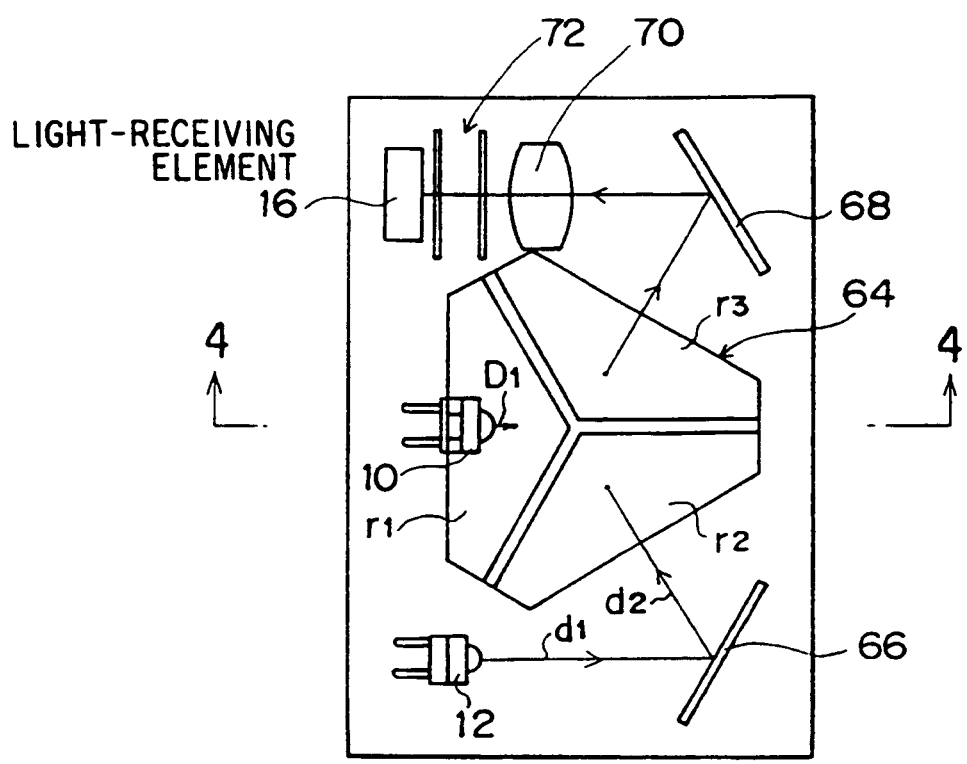
FIG. 3 is a plan view, taken in a direction from a reflection plate, of a vehicle height sensor 34.
Figure 4:
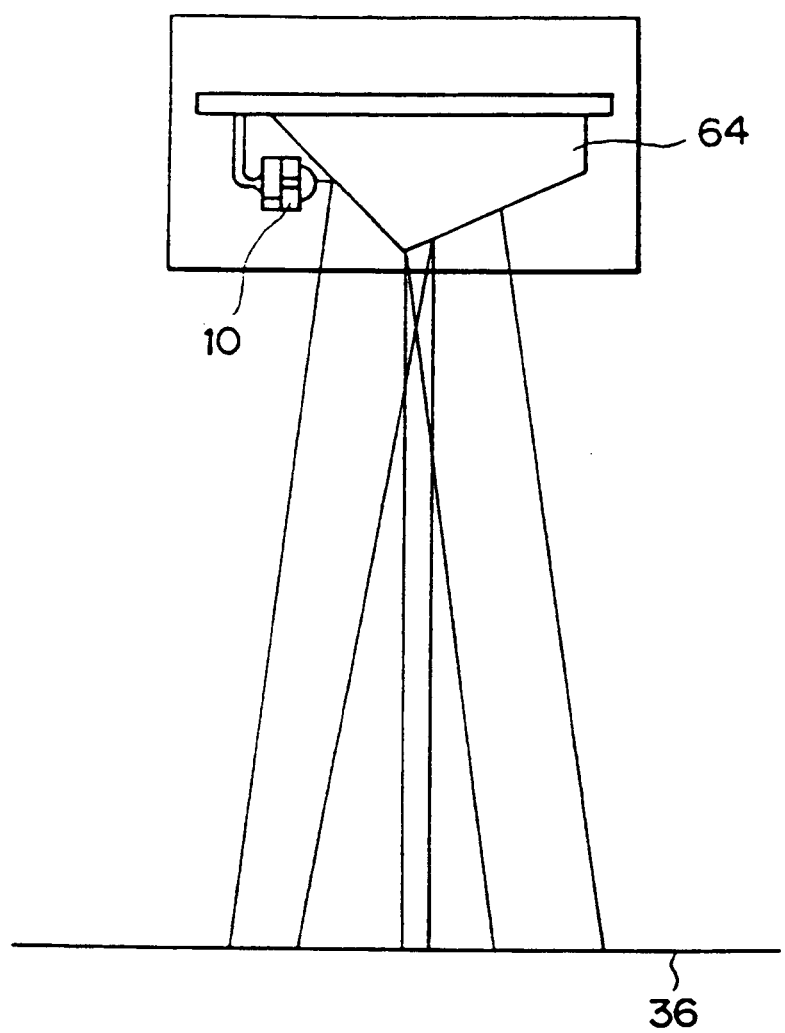
FIG. 4 is a cross-sectional view of the vehicle height sensor 34 taken along the line 4—4 of FIG. 3.
Figure 11:
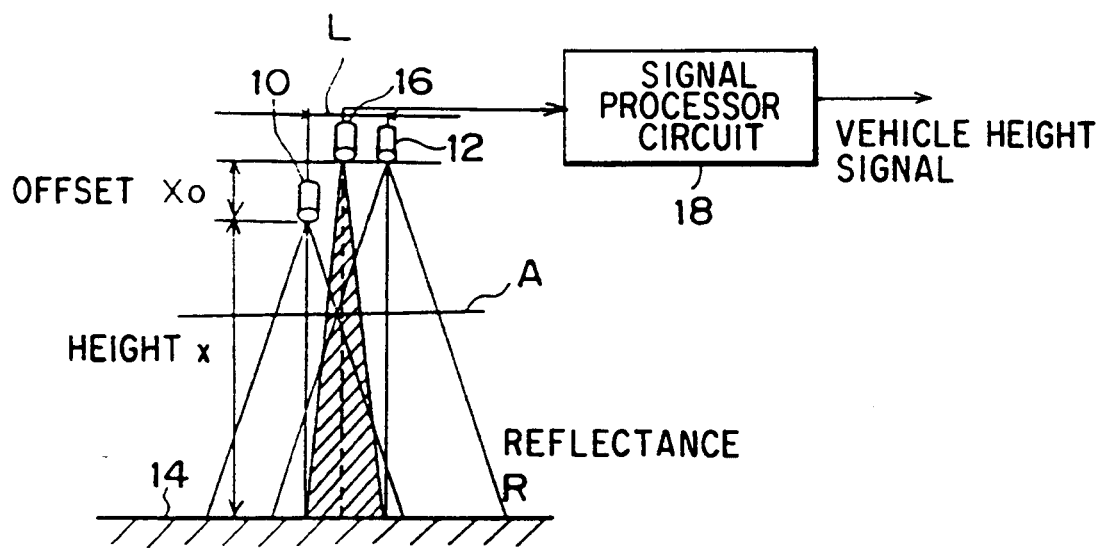
FIG. 11 is a schematic diagram illustrating a basic principle of a height sensor in which the light-emitting elements are disposed by being offset from each other.
Figure 12:
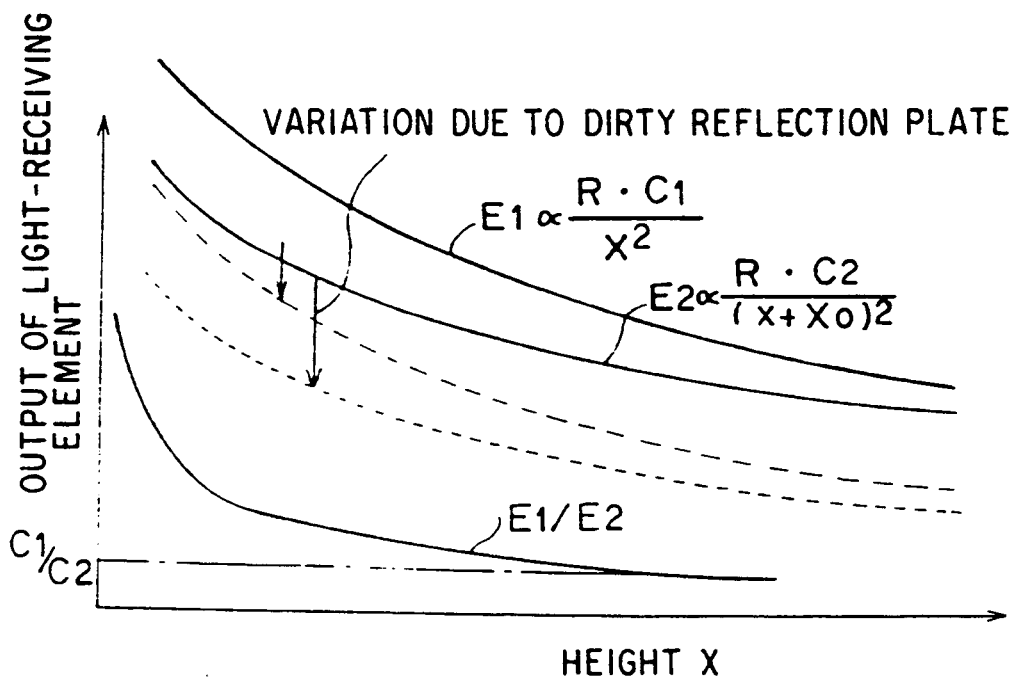
FIG. 12 is a diagram illustrating the relationship between the output of the light-emitting element of the height sensor shown in FIG. 11 and the height.

FIG. 3 shows a plan view, taken in a direction from the reflection plate, of the vehicle height sensor 34. FIG. 4 shows a cross-sectional view of the vehicle height sensor 34 taken along the line 4—4 of FIG. 3. As shown in FIGS. 3 and 4, the vehicle height sensor 34 is provided with a reflecting member 64 having the shape of a triangular pyramid and comprising three reflecting surfaces r1, r2, and r3. Each of the reflecting surfaces r1, r2, and r3 forms an angle of 45° with respect to the bottom surface. This reflecting member is formed by subjecting a resinous component having the shape of a triangular pyramid to metal plating. A first light-emitting element 10 is disposed in such a manner as to oppose one reflecting surface r1. A mirror 66 is disposed in such a manner as to oppose another reflecting surface r2, and a second light-emitting element 12 is disposed in such a manner as to emit a beam of light onto this mirror 66. This reflecting member 64 is used so that those portions of the optical paths of the light beams that lead from respective reflecting portions of the reflecting member 64 to the reflection plate 36 become close to each other after the beams are emitted from the first and second light-emitting elements 10, 12. Meanwhile, the mirror 66 is used to create an optical path difference between the optical path lengths from the light-emitting elements 10, 12 to the reflection plate 36. The light-emitting elements 10, 12 are located at the same height as viewed in a direction perpendicular to the plane of FIG. 3. The light beam emitted from the first light-emitting element 10 is reflected by the reflecting surface r1 to undergo a change in direction by 90°, i.e., the light beam is reflected in a direction perpendicular to the plane of FIG. 3. As a result, even if the light-emitting elements 10, 12 are disposed by being spaced apart from each other as viewed in the horizontal direction, the optical path of the beam emitted from the light-emitting element 10 and reflected from the reflecting surface r1 and the optical path of the beam emitted from the light-emitting element 12 and reflected from the reflecting surface r2 are brought into close proximity with each other. It should be noted that these optical paths may be made to virtually conincide. In addition, since the beam emitted from the light-emitting element 12 is reflected by the mirror 66 and is made incident upon the reflecting surface r2, an optical path difference $D=D2-D1$ occurs between an optical path length D1 from the light-emitting element 10 to the reflecting surface r1 and an optical path length D2 ($=d1+d2$) from the light-emitting element 12 to the reflecting surface r2, where d1 is an optical path length from the light-emitting element 12 to the mirror 66, while d2 is an optical path length from the mirror 66 to the reflecting surface r2. This optical path difference is equivalent to the amount of offset $X_o$ shown in FIG. 11. In the present invention, since a reflecting means such as the mirror 66 is used, this optical path difference D can be made large even within a limited space, so that the sensor accuracy can be improved.

A mirror 68 is disposed in such a manner as to oppose the reflecting surface r3 of the reflecting member 64, and a light-receiving element 16 is disposed in such a manner as to oppose this mirror 68. A condenser lens 70 and predetermined diaphragms 72 are disposed between the mirror 68 and the light-receiving element 16.

According to this vehicle height sensor 34, the light beams reflected from the reflecting surfaces r1, r2 of the reflecting member 64 are applied to the reflection plate 36, are reflected by the reflecting surface r3 after being reflected by the reflection plate 36, and are received by the light-receiving element 16 via the mirror 68, the condenser lens 70, and the diaphragms 72.

Figure 5:
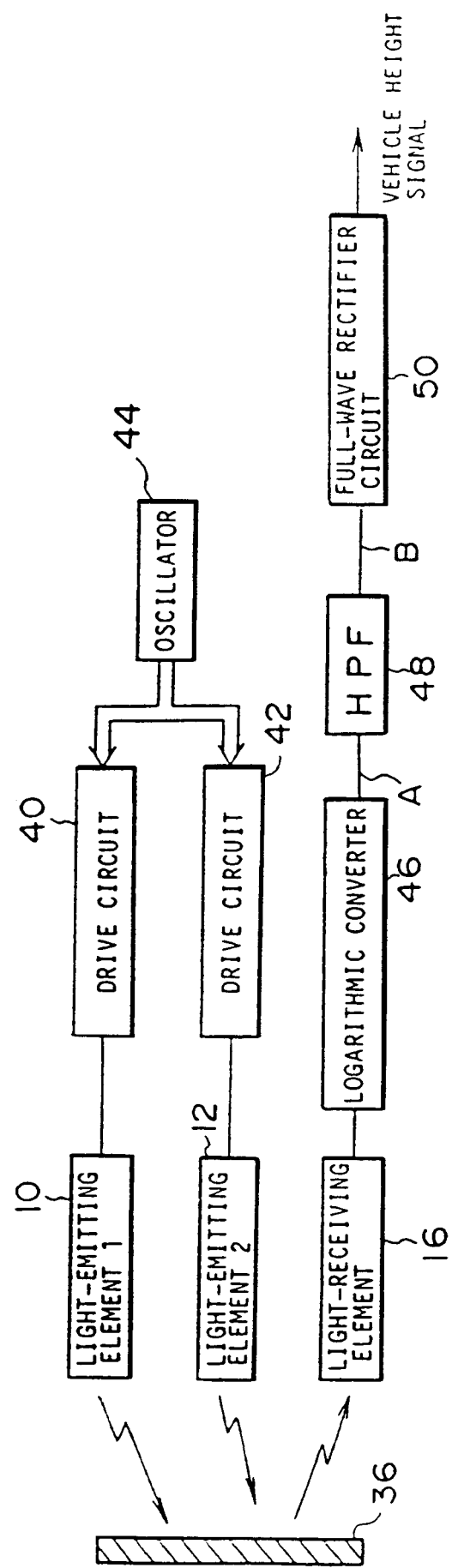
FIG. 5 is a block diagram of the height sensor and a signal processor circuit used in accordance with the present invention.

As shown in FIG. 5, a drive circuit 40 and a drive circuit 42 are respectively connected to the first light-emitting element 10 and the second light-emitting element 12. An oscillator 44 which oscillates in response to a time-divisional drive frequency calculated from a cyclic measuring period required for the sensor is connected to each drive circuit 40 and 42. For this reason, the first light-emitting element 10 and the second light-emitting element 12 are alternately caused, by the oscillator 44, to emit beams in response to the time-divisional drive frequency signal via the drive circuits 40 and 42. The drive circuits 40, 42 and the oscillator 44 form a light emission control circuit.

The light-receiving element 16 is connected to a full-wave rectifier circuit 50 via a logarithmic converter 46 and a high-pass filter 48 having a cut-off frequency lower than the time-divisional drive frequency of the oscillator 44. The logarithmic converter 46, the high-pass filter 48, and the full-wave rectifier circuit 50 form a received-light signal processor circuit.

Figure 6:
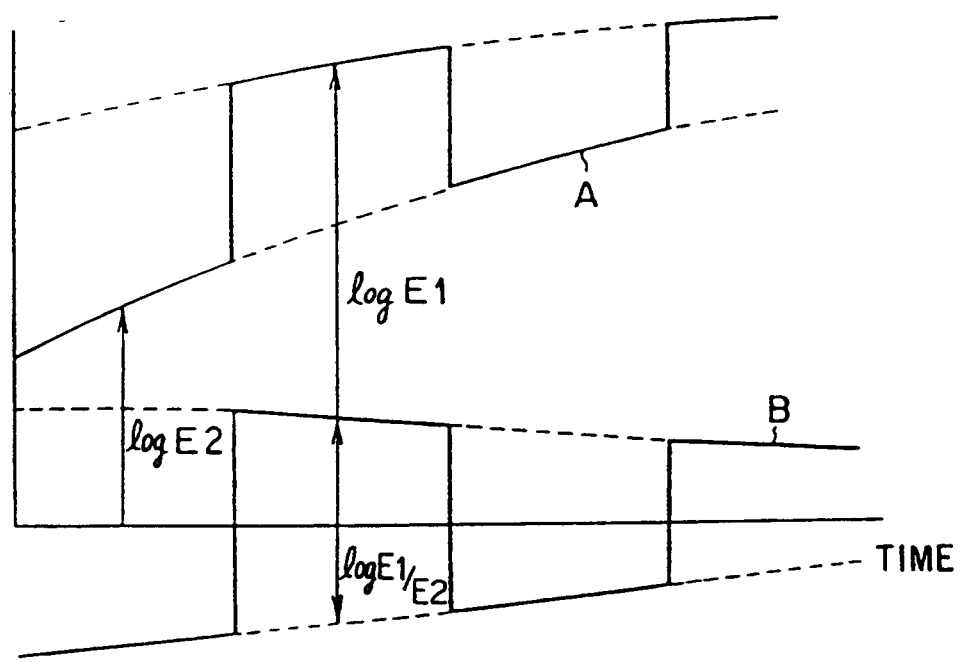
FIG. 6 is a diagram illustrating waveforms respective components shown in FIG. 5.

The operation of this embodiment will now be described. The oscillator 44 causes the first light-emitting element 10 and the second light-emitting element 12 to alternately emit light beams via their corresponding drive circuits 40 and 42. The beams generated from the first light-emitting element 10 and the second light-emitting element 12 are applied to the reflection plate 36 via the reflecting member 64, are reflected by the reflection plate 36, and are received by the light-receiving element 16. The light-receiving element 16 produces a signal of a level corresponding to the quantity of light received. This signal is logarithmically converted by the logarithmic converter 46. A curve A in FIG. 6 indicates the waveform of an output from the logarithmic converter 46. The output of the logarithmic converter 46 has direct current components, corresponding to the components of a frequency lower than the time-divisional drive frequency of the oscillator 44, removed therefrom by the high-pass filter 48, so that the resulting output has only an alternating current component as indicated by a curve B in FIG. 6. The peak-to-peak value of this alternating current (twice as large as the amplitude) becomes the logarithm of a ratio E1/E2 where E1 represents the output of the first light-emitting element 10 and E2 the output of the second light-emitting element 12. The full-wave rectifier circuit 50 rectifies all of the output waves of the high-pass filter 48, thereby converting them to a direct current component. Accordingly, the output of this full-wave rectifier circuit 50 represents the height from the vehicle height sensor 34 to the reflection plate 36, i.e., the vehicle height.

According to this embodiment, since the light-emitting control circuit and the received-light signal processor circuit are constructed using an analog circuit in a simplified manner, these circuits can be incorporated integrally with the sensor. This enhances the maintainability and, at the same time, enables not only a reduction in the required space but also a reduction in the number of mounting processes. It should be noted that the received-light signal processor circuit may be provided inside the control circuit 38.

Figure 7:
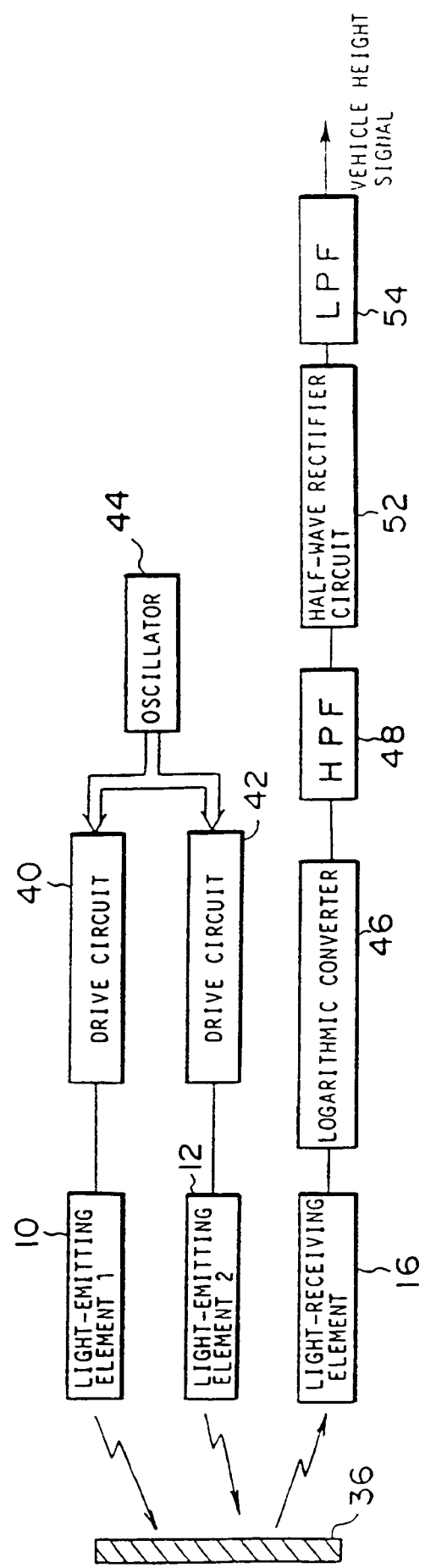
FIG. 7 is a block diagram illustrating a modification of the first embodiment.

Next, a modification of the first embodiment will be described with reference to FIG. 7. In this modification, a half-wave rectifier circuit 52 and a low-pass filter 54 are provided in place of the full-wave rectifier circuit 50. According to this modification, the output of the high-pass filter 48 is subjected, by the half-wave rectifier circuit 52, to rectification of the half waves and is smoothed by low-pass filter 54, to obtain a similar vehicle-height signal to that obtained in the first embodiment.

Figure 8:
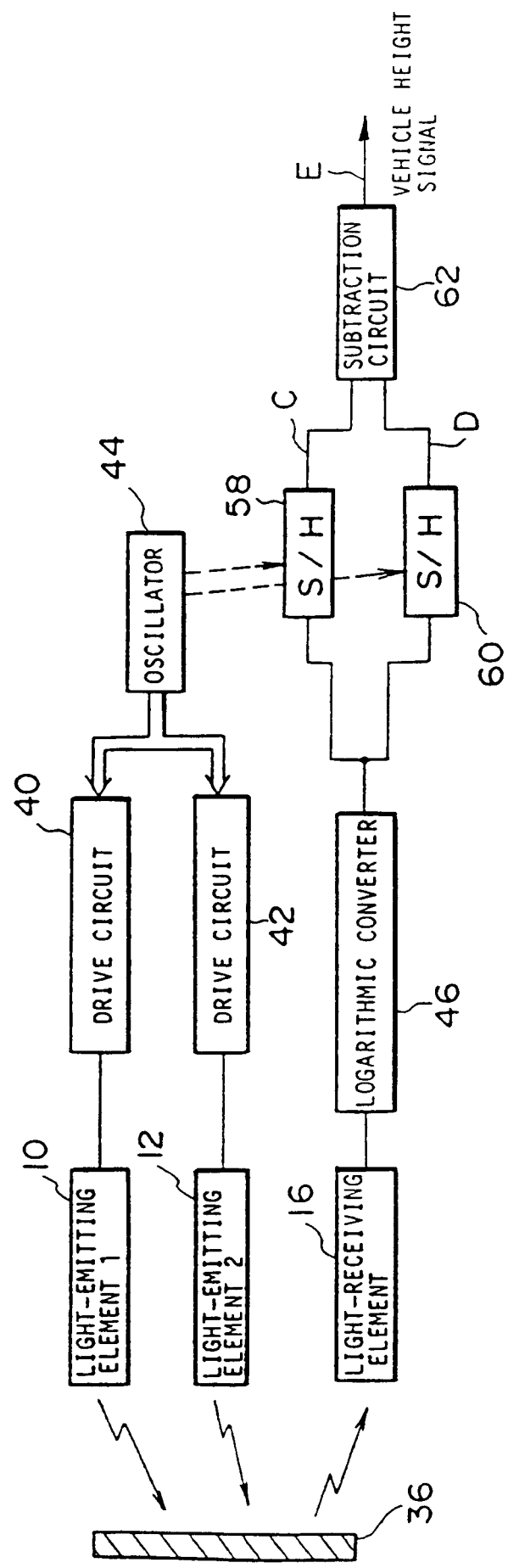
FIG. 8 is a block diagram illustrating a second embodiment.

Next, a second embodiment of the present invention will be described with reference to FIG. 8. In this embodiment, a vehicle height sensor similar to that of the first embodiment shown in FIGS. 3 and 4 is used, but a sample-and-hold circuit and a subtraction circuit are used in place of the high-pass filter 48 and the full-wave rectifier circuit 50 used in the first embodiment. The logarithmic converter 46 is connected to a first sample-and-hold circuit 58 and a second sample-and-hold circuit 60, which in turn are connected to a subtraction circuit 62. The oscillator 44 effects control such that signals are held in the first sample-and-hold circuit 58 and the second sample-and-hold circuit 60 in synchronous relation to its causing alternating emission of the beams from the first light-emitting element 10 and the second light-emitting element 12.

Figure 9:
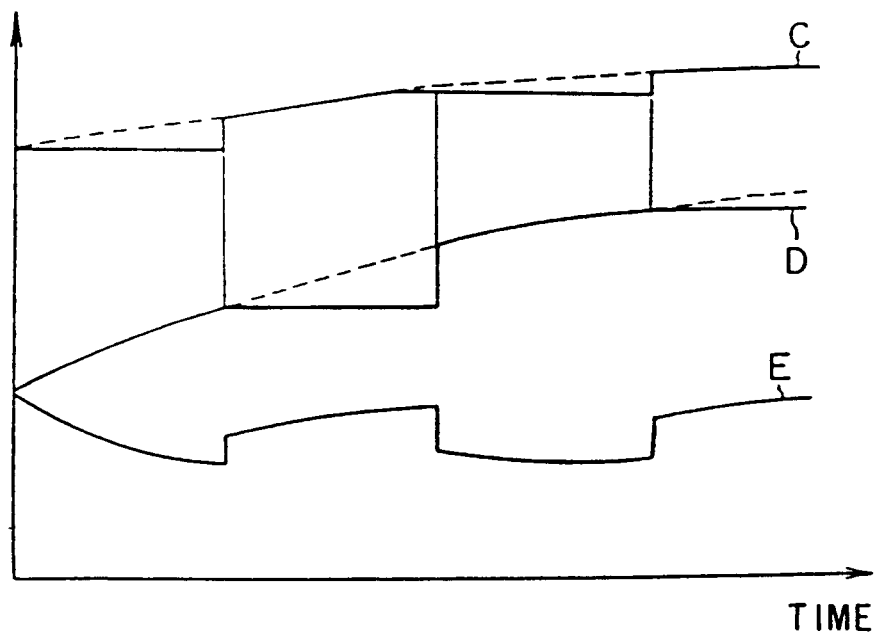
FIG. 9 is a diagram illustrating waveforms of respective components shown in FIG. 8.

The operation of this embodiment will now be described. The oscillator 44 and the sample-and-hold circuits 58 and 60 are controlled so that the signal outputted from the logarithmic converter 46 when the beam is emitted from the first light-emitting element 10 and the signal outputted therefrom when the beam is emitted from the second light-emitting element 12 may be respectively held in the first sample-and-hold circuit 58 and in the second sample-and-hold circuit 60 synchronously as the oscillator 44 causes the first light-emitting element 10 and the second light-emitting element 12 to alternately emit light beams. The outputs of the first sample-and-hold circuit 58 and the second sample-and-hold circuit 60 are indicated at C and D in FIG. 9. The subtraction circuit 62 calculates the difference between the output of the first sample-and-hold circuit 58 and the output of the second sample-and-hold circuit 60 to output a signal E shown in FIG. 9. This signal E represents the vehicle height as in the case of the first embodiment.

Figure 10:
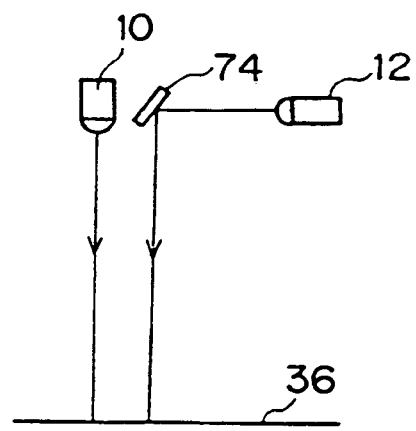
FIG. 10 is a schematic diagram illustrating another example of the arrangement of light-emitting elements.

Although, in the foregoing embodiments, a description has been given of a case where the height sensor is used as a vehicle height sensor, the height sensor of the present invention can be utilized as a rear-view monitoring sensor or level sensor for a vehicle, a position sensor for a machine tool, or the like. In addition, although in the foregoing embodiments a description has been given of an example in which the beams emitted from the light-emitting elements are reflected by two reflecting surfaces, an arrangement may be provided as shown in FIG. 10 in which a pair of light-emitting elements are disposed such that the emitting direction of the first light-emitting element 10 and the emitting direction of the second light-emitting element 12 are perpendicular to each other, and the beam emitted from one of the light-emitting elements is reflected by a mirror 74. Furthermore, although the reflecting member having the shape of a triangular pyramid is used in the above-described embodiments, a plurality of ordinary flat mirrors may be used. Although the light-emitting elements are alternately caused to emit beams of light in the above-described embodiments, it is possible to use light-emitting elements adapted to emit light beams of mutually different wavelengths and to cause them to emit beams simultaneously. In this case, the beams reflected by the reflection plate are separated for the respective wavelengths, and are received by two light-receiving elements.

As described above, in accordance with the present invention, since a large optical path difference, i.e., a large amount of offset, can be secured within a sensor case of a small space, the accuracy of the sensor improves. In addition, the area of light which cannot be measured in the case of a short range in accordance with the prior art can be reduced, the measurement range can be made long, and the measurement accuracy in the neat and medium distances can be improved.

Furthermore, if the sensor is mounted to the vehicle body-side end cap in the air spring for an automobile, and is set in such a manner as to cause the light to be radiated to a piston portion on the lower side of the air spring or to a reflection plate attached thereto, the vibration damping structure can be simplified. This results in the improved reliability of the air cushion. Also, the sensor is protected against stones, mud, water, and the like being kicked up from the road surface.

Unlike the conventional externally-mounted sensor, a case which is sturdy and completely waterproof is not required, and, a resinous case, for example, is sufficient. For this reason, it is possible to a compact, lightweight sensor and reduce the cost.

The sensor inside the air spring can be readily mounted inside the air spring when the air spring is assembled. The conventionally required processes of mounting the sensor to the vehicle are unnecessary, and adjustment after mounting is not required, so that it is possible to reduce the cost of the air suspension on the whole.

In the field of general industrial machines as well, it is possible to provide a low-cost optical displacement gauge. In particular, with respect to facilities requiring air-spring support for purposes of vibration isolation and damping, it is possible to provide an air spring which does not require the external mounting of the sensor.

Furthermore, in the detection of the height of the road surface during the running of an automobile, if a measure is provided for eliminating the effect of a change in the external light, e.g., if the luminous intensity of the emitted light is modulated and a filter for detecting only the intensity of the modulated light is provided in a light-receiving circuit (which measure is generally practiced), it is possible to provide a road-surface-height sensor which is not affected by a change in the road-surface reflectance. Also, by using that sensor, it is possible to realize a displacement gauge for a general industrial machine as a low-cost optical displacement gauge.

As described above, in accordance with the present invention, it is possible to provide a height sensor and an air spring incorporating the height sensor, which have a long measurement range and are capable of detecting the distance to a surface to be measured even in the case of a short range.

In addition, in accordance with the present invention, it is possible to provide a compact height sensor and an air spring incorporating the height sensor, which are capable of detecting the distance without being affected by the contamination of the reflecting surface or the like.

If these air springs are used in a vehicle, it is possible to provide a highly reliable air spring system which undergoes little trouble since the sensor is protected against stones, mud, water, and the like being kicked up from the road surface.

What is claimed is:

1. A height sensor for determining the height from a surface to be measured on the basis of an optical path length from a light-emitting element to the surface to be measured, comprising:

a first light-emitting element and a second light-emitting element disposed at positions spaced apart from the surface to be measured;

an oscillator connected to the first and second light emitting elements for causing the first and second light emitting elements to alternately emit light;

reflecting means for reflecting at least one of a beam of light emitted from said first light-emitting element and a beam of light emitted from said second light-emitting element, said reflecting means being arranged to cause respective optical paths of the beams to be brought into close proximity to each other, wherein said reflecting means is a three-dimensional mirror whose slanting surfaces are mirror surfaces, the beams emitted from said first light-emitting and said second light-emitting element being respectively reflected onto the surface to be measured by means of different slanting surfaces;

a light-receiving element for receiving the beams emitted by said first light-emitting element and said second light-emitting element and reflected by the surface to be measured and for outputting a signal corresponding to a quantity of light received;

a converter for converting the signal output by the light receiving element into a ratio of light output by the first and second light emitting elements; and a circuit for converting the ratio output by the converter into a signal representing the height from the surface to be measured.

2. The height sensor according to claim 1, wherein the beam from said first light-emitting element is made incident upon one of the slanting surfaces of said three-dimensional mirror via another reflecting means.

3. The height sensor according to claim 1, wherein the converter includes a logarithmic converter circuit for logarithmically converting the signal outputted from said light-receiving elements and a filter for removing direct current components of an output from said logarithmic converter circuit, and the circuit is a rectifier circuit for rectifying an output of said filter.

4. The height sensor according to claim 1, wherein the converter is a logarithmic converter circuit for logarithmically converting the signal outputted from said light-receiving element, and the circuit includes a pair of holding circuits for holding the outputs from said logarithmic converter circuit in corresponding relation to the beams from said first and second light-emitting elements and a subtraction circuit for calculating a difference between hold values which are held in said holding circuits.

5. A height sensor for determining the height from a surface to be measured on the basis of an optical path length from a light-emitting element to the surface to be measured, comprising:

a first light-emitting element and a second light-emitting element disposed at positions spaced apart substantially a same distance from the surface to be measured;

an oscillator connected to the first and second light emitting elements for causing the first and second light emitting elements to alternately emit light;

reflecting means arranged to reflect and introduce to the surface to be measured at least one of a beam of light emitted from said first light-emitting element and a beam of light emitted from said second light-emitting element so as to provide an optical path difference between an optical path length from said first light-emitting element to the surface to be measured and an optical path length from said second light-emitting element to the surface to be measured; and a light-receiving element for receiving the beams emitted by said first light-emitting element and said second light-emitting element and reflected by the surface to be measured and for outputting a signal corresponding to a quantity of light received;

a converter for converting the signal output by the light receiving element into a ratio of light output by the first and second light emitting elements; and a circuit for converting the ratio output by the converter into a signal representing the height from the surface to be measured.

6. The height sensor according to claim 5, wherein the converter includes a logarithmic converter circuit for logarithmically converting the signal outputted from said light-receiving element and a filter for removing direction current components of an output from said logarithmic converter circuit, and the circuit includes a rectifier circuit for rectifying an output of said filter.

7. The height sensor according to claim 5, wherein the converter includes a logarithmic converter circuit for logarithmically converting the signal outputted from said light-receiving element, and the circuit includes a pair of holding circuits for holding the outputs from said logarithmic converter circuit in corresponding relation to the beams from said first and second light-emitting elements and a subtraction circuit for calculating a difference between hold values which are held in said holding circuits.

8. A height sensor for determining the height from a surface to be measured on the basis of an optical path length from a light-emitting element to the surface to be measured, comprising:

a first light-emitting element and a second light-emitting element disposed at positions spaced apart from the surface to be measured;

an oscillator connected to the first and second light emitting elements for causing the first and second light-emitting elements to alternately emit light;

a light-receiving element for receiving beams of light respectively emitted by said first light-emitting element and said second light-emitting element and reflected by the surface to be measured and for outputting a signal corresponding to a quantity of light received;

a converter for converting the signal output by the light receiving element into a ratio of light output by the first and second light emitting elements;

a circuit for converting the ratio output by the converter into a signal representing the height from the surface to be measured; and a three-dimensional mirror having a shape of a triangular pyramid whose three slanting surfaces are formed as mirror surfaces and whose apex is oriented toward the surface to be measured, wherein the light-emitting elements and said three-dimensional mirror are arranged such that the beam emitted from said first light-emitting element is reflected by a first slanting surface of said three-dimensional mirror onto the surface to be measured, and such that the beam emitted from said second light-emitting element is reflected by a second slanting surface of said three-dimensional mirror onto the surface to be measured.

9. The height sensor according to claim 8, further comprising a reflecting mirror for reflecting the beam from said first light-emitting element onto said first slanting surface of said three-dimensional mirror.

10. The height sensor according to claim 8, wherein said light-receiving element is arranged so as to receive the beams reflected from the surface to be measured and reflected from a third slanting surface of said three-dimensional mirror.

11. The height sensor according to claim 10, further comprising a reflecting mirror for reflecting the beams reflected from said third slanting surface of said three-dimensional mirror to be made incident upon said light-receiving element.

12. The height sensor according to claim 8, wherein said first light-emitting element and said second light-emitting element are disposed at positions spaced apart a substantially identical distance from the surface to be measured.

13. The height sensor according to claim 8, wherein the converter includes a logarithmic converter circuit for logarithmically converting the signal outputted from said light-receiving element and a filter for removing direct current components of an output from said logarithmic converter circuit, and the circuit includes a rectifier circuit for rectifying an output of said filter.

14. The height sensor according to claim 8, wherein the converter includes a logarithmic converter circuit for logarithmically converting the signal outputted from said light-receiving element, and the circuit includes a pair of holding circuits for holding the outputs from said logarithmic converter circuit in corresponding relation to the beams from said first and second light-emitting elements and a subtraction circuit for calculating a difference between hold values which are held in said holding circuits.

15. An air spring device with a height sensor, comprising:

an air spring;

a reflection plate mounted to one of an upper spring member and a lower spring member of said air spring;

a first light-emitting element, a second light-emitting element, and a light-receiving element which are mounted to the other one of said upper spring member and said lower spring member, said light-receiving element being adapted to receive beams of light respectively emitted from said light-emitting elements and reflected by said reflection plate and to output a signal corresponding to a quantity of light received;

an oscillator connected to the first and second light emitting elements for causing the first and second light emitting elements to alternately light;

reflecting means for reflecting the beams respectively emitted from said first light-emitting element and said second light-emitting element, said reflecting means being arranged to cause respective optical paths of the beams to be brought into close proximity to each other, wherein said reflecting means is a three-dimensional mirror whose slanting surfaces are mirror surfaces, the beams emitted from said first light-emitting and said second light-emitting element being respectively reflected onto the surface to be measured by means of different slanting surfaces;

a converter for converting the signal output by the light receiving element into a ratio of light output by the first and second light emitting elements; and a circuit for converting the ratio output by the converter into a signal representing a height from the surface to be measured.

16. The air spring device with a height sensor according to claim 15, wherein the converter includes a logarithmic converter circuit for logarithmically converting the signal outputted from said light-receiving element and a filter for removing direct current components of an output from said logarithmic converter circuit, and the circuit includes a rectifier circuit for rectifying an output of said filter.

17. The air spring device with a height sensor according to claim 15, wherein the converter includes a logarithmic converter circuit for logarithmically converting the signal outputted from said light-receiving element, and the circuit includes a pair of holding circuits for holding the outputs from said logarithmic converter circuit in corresponding relation to the beams from said first and second light-emitting elements and a subtraction circuit for calculating a difference between hold values which are held in said holding circuits.

18. An air spring device with a height sensor, comprising:
an air spring;
a reflection plate mounted to one of an upper spring member and a lower spring member of said air spring;
a first light-emitting element and a second light-emitting element both mounted to the other one of said upper spring member and said lower spring member and a light-receiving element for receiving beams of light respectively emitted from said light-emitting elements and reflected by said reflection plate and for outputting a signal corresponding to a quantity of light received, said first light-emitting element and said second light-emitting element being disposed at positions spaced apart substantially a same distance from said reflection plate;
an oscillator connected to the first and second light emitting elements for causing the first and second light emitting elements to alternately emit light;
at least one reflecting means arranged to reflect and introduce to said reflection plate at least one of the beam emitted from said light-emitting element and the beam emitted from said second light-emitting element so as to provide an optical path difference between an optical path length from said first light-emitting element to said reflection plate and an optical path length from said second light-emitting element to the reflection plate;
a converter for converting the signal output by the light receiving element into a ratio of light output by the first and second light emitting elements; and
a circuit for converting the ratio output by the converter into a signal representing a height from the surface to be measured.

19. The air spring device with a height sensor according to claim 18, wherein the converter includes a logarithmic converter circuit for logarithmically converting the signal outputted from said light-receiving element and a filter for removing direct current components of an output from said logarithmic converter circuit, and the circuit includes a rectifier circuit for rectifying an output of said filter.

20. The air spring device with a height sensor according to claim 18, wherein the converter includes a logarithmic converter circuit for logarithmically converting the signal outputted from said light-receiving element, and the circuit includes a pair of holding circuits for holding the outputs from said logarithmic converter circuit in corresponding relation to the beams from said first and second light-emitting elements and a subtraction circuit for calculating a difference between hold values which are held in said holding circuits.

21. An air spring device with a height sensor, comprising:
an air spring;
a reflection plate mounted to one of an upper spring member and a lower spring member of said air spring;
a first light-emitting element and second light-emitting element mounted to the other one of said upper spring member and said lower spring member and a light-receiving element for receiving beams of light respectively emitted from said light-emitting elements and reflected by said reflection plate and for outputting a signal corresponding to a quantity of light received;
an oscillator connected to the first and second light emitting elements for causing the first and second light emitting elements to alternately emit light;
a converter for converting the signal output by the light receiving element into a ratio of light output by the first and second light emitting elements;
a circuit for converting the ratio output by the converter into a signal representing a height from the surface to be measured; and
a three-dimensional mirror having a shape of a triangular pyramid whose three slanting surfaces are formed as mirror surfaces and whose apex is oriented toward said reflection plate,
wherein said light-emitting elements and said three-dimensional mirror are disposed on one of said spring members such that the beam emitted from said first light-emitting element is reflected by a first slanting surface of said three-dimensional mirror onto said reflection plate, and such that the beam emitted from said second light-emitting element is reflected by a second slanting surface of said three-dimensional mirror onto said reflection plate.

22. The air spring device according to claim 21, further comprising a reflecting mirror for reflecting the beam from said first light-emitting element onto said first slanting surface of said three-dimensional mirror.

23. The air spring device according to claim 21, wherein said light-receiving element is arranged so as to receive the beams reflected from the surface to be measured and reflected from a third slanting surface of said three-dimensional mirror.

24. The air spring device according to claim 23, further comprising a reflecting mirror for causing the beams reflected from said third slanting surface of said three-dimensional mirror to be made incident upon said light-receiving element.

25. The air spring device with a height sensor according to claim 21, wherein the converter includes a logarithmic converter circuit for logarithmically converting the signal outputted from said light-receiving element and a filter for removing direct current components of an output from said logarithmic converter circuit, and the circuit includes a rectifier circuit for rectifying an output of said filter.

26. The air spring device with a height sensor according to claim 21, wherein the converter includes a logarithmic converter circuit for logarithmically converting the signal outputted from said light-receiving element, and the circuit includes a pair of holding circuits for holding the outputs from said logarithmic converter circuit in corresponding relation to the beams from said first and second light-emitting elements and a subtraction circuit for calculating a difference between hold values which are held in said holding circuits.

* * * * *